(12) United States Patent
Sato et al.

(10) Patent No.: US 11,207,692 B2
(45) Date of Patent: Dec. 28, 2021

(54) REAGENT CARTRIDGE

(71) Applicant: EIKEN KAGAKU KABUSHIKI KAISHA, Tokyo (JP)

(72) Inventors: Masaki Sato, Tochigi (JP); Masato Hamasaki, Tochigi (JP); Syota Yuki, Tochigi (JP); Masahiko Fukumoto, Kasai (JP)

(73) Assignee: EIKEN KAGAKU KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 16/614,792

(22) PCT Filed: May 7, 2018

(86) PCT No.: PCT/JP2018/017629
§ 371 (c)(1),
(2) Date: Nov. 18, 2019

(87) PCT Pub. No.: WO2018/216451
PCT Pub. Date: Nov. 29, 2018

(65) Prior Publication Data
US 2020/0188923 A1    Jun. 18, 2020

(30) Foreign Application Priority Data

May 22, 2017    (JP) .............................. JP2017-100901

(51) Int. Cl.
*B01L 3/00*    (2006.01)
*B01L 9/06*    (2006.01)

(52) U.S. Cl.
CPC ...... *B01L 9/06* (2013.01); *B01L 3/52* (2013.01); *B01L 2200/16* (2013.01);
(Continued)

(58) Field of Classification Search
CPC ...... B01L 9/06; B01L 9/00; B01L 3/52; B01L 3/50; B01L 3/00; B01L 2200/16;
(Continued)

(56) References Cited

U.S. PATENT DOCUMENTS 6,398,705 B1 * 6/2002 Grumberg ............. B04B 5/0414
494/16
8,771,615 B2 * 7/2014 Shibata ................ B65D 51/227
422/550
(Continued)

FOREIGN PATENT DOCUMENTS

EP       3636738 A1    4/2020
JP       H5-172827 A   7/1993
(Continued)

OTHER PUBLICATIONS

European Patent Office, Extended European Search Report issued in EP Patent Application No. 18805312.8, dated Apr. 28, 2021, pp. 1-14.
(Continued)

*Primary Examiner* — Christine T Mui
(74) *Attorney, Agent, or Firm* — Pillsbury Winthrop Shaw Pittman LLP

(57) ABSTRACT

Provided is a reagent cartridge configured to be set in a genetic testing device and the reagent cartridge includes a plurality of reagent containers in which a reagent is filled, and a holder formed with a plurality of opening parts in which the reagent containers are loaded and configured to hold the reagent containers loaded in the opening parts, in which the holder holds the reagent containers with an allowance in a vertical direction in a state in which the reagent cartridge is set in the genetic testing device.

8 Claims, 17 Drawing Sheets

(52) U.S. Cl.
CPC ... *B01L 2300/021* (2013.01); *B01L 2300/041* (2013.01); *B01L 2300/0832* (2013.01)

(58) Field of Classification Search
CPC .......... B01L 2200/00; B01L 2300/021; B01L 2300/02; B01L 2300/00; B01L 2300/041; B01L 2300/04; B01L 2300/0832; B01L 2300/08
USPC .................................................. 422/562, 500
See application file for complete search history.

(56) References Cited

U.S. PATENT DOCUMENTS

| | | |
|---|---|---|
| 2007/0116600 A1 | 5/2007 | Kochar et al. |
| 2009/0047180 A1* | 2/2009 | Kawahara ........... B01L 3/50855 422/82.05 |
| 2009/0221059 A1 | 9/2009 | Williams et al. |
| 2013/0084606 A1 | 4/2013 | Sugimoto et al. |
| 2014/0260118 A1 | 9/2014 | Knight |
| 2015/0376562 A1 | 12/2015 | Baum et al. |
| 2017/0153264 A1* | 6/2017 | Buse .................. B65D 39/0029 |

FOREIGN PATENT DOCUMENTS

| | | |
|---|---|---|
| JP | H6-233670 A | 8/1994 |
| JP | H8-112087 A | 5/1996 |
| JP | H11-515106 A | 12/1999 |
| JP | 2005-502034 A | 1/2005 |
| JP | 2013-150634 A | 8/2013 |
| WO | 199716734 A1 | 5/1997 |
| WO | 2003020427 A1 | 3/2003 |

OTHER PUBLICATIONS

European Patent Office, Supplemental European Search Report issued in EP Patent Application No. 18805312.8, dated Dec. 18, 2020, pp. 1-13.
Patent Cooperation Treaty, International Preliminary Report on Patentability for PCT/JP2018/017629, dated Nov. 26, 2019, pp. 1-9.

* cited by examiner

REAGENT CARTRIDGE

RELATED PATENT APPLICATIONS

This application is based on and claims the benefit of priority from International Application No. PCT/JP2018/017629, filed on May 7, 2018, which claims priority to Japanese Patent Application No. 2017-100901, filed on May 22, 2017, the contents of which are hereby incorporated by reference in their entirety.

TECHNICAL FIELD

The present invention relates to a reagent cartridge in which a pretreatment reagent or the like used in a genetic testing device is filled.

BACKGROUND ART

In recent years, genetic testing using PCR (Polymerase Chain Reaction) method, LAMP (Loop-mediated Isothermal Amplification) method, or the like has been performed. Such genetic testing is configured to include an extraction and purification step in which a nucleic acid of a target gene is extracted and purified from an analyte, an amplification step in which the nucleic acid extracted and purified in the extraction and purification step is amplified, and a detection step in which the nucleic acid amplified in the amplification step is detected. Further, the extraction and purification step is also referred to as pretreatment for genetic testing.

In such genetic testing, a reaction tube into which an analyte and an extraction liquid are injected, a reagent cartridge having a plurality of reagent containers in which a pretreatment reagent (hereinafter, also simply referred to as "reagent") is filled, and a microchip in which a reaction reagent to be reacted (amplified) with a nucleic acid of a target gene in a plurality of wells is enclosed are set in a genetic testing device. As genetic testing devices, for example, a real-time turbidity measuring device Loopam-pEXIA (registered trademark of Eiken Chemical Co., Ltd.) manufactured by Eiken Chemical Co., Ltd. may be used.

A reagent cartridge includes a plurality of reagent containers in which a pretreatment reagent is filled (see, for example, Patent Literatures 1 and 2). Also, the genetic testing device dispenses the pretreatment reagent from the respective reagent containers of the reagent cartridge into a reaction tube to generate a sample solution in which a nucleic acid of a target gene is extracted and purified.

CITATION LIST

Patent Literature

[Patent Literature 1] Japanese Unexamined Patent Publication No. 2005-502034
[Patent Literature 2] Japanese Unexamined Patent Publication No. H11-515106

SUMMARY OF INVENTION

Technical Problem

In the reagent cartridges described in Patent Literatures 1 and 2, a plurality of reagent containers are fixedly held. Therefore, if distortion or bending occurs in the reagent cartridges, when the reagent cartridges are set in the genetic testing device, a problem in which heights of the respective reagent containers are not uniform occurs. As a result, since liquid levels of the reagents filled in the respective reagent containers are misaligned, it becomes difficult to adjust a dispensing amount of the reagent.

Therefore, an objective of one aspect of the present invention is to provide a reagent cartridge in which heights of the respective reagent containers can be made uniform when the reagent cartridge is set in a genetic testing device.

Solution to Problem

A reagent cartridge according to one aspect of the present invention is a reagent cartridge configured to be set in a genetic testing device and includes a plurality of reagent containers in which a reagent is filled, and a holder formed with a plurality of opening parts in which the reagent containers are loaded and configured to hold the reagent containers loaded in the opening parts, in which the holder holds the reagent containers with an allowance in a vertical direction in a state in which the reagent cartridge is set in the genetic testing device.

In this reagent cartridge, since the holder holds the reagent containers with an allowance in the vertical direction, each of the reagent containers can move in the vertical direction within a range of the allowance. Therefore, when the reagent cartridge is set in the genetic testing device and the reagent containers are brought into contact with an installation surface of the genetic testing device, the reagent containers move in the vertical direction within a range of the allowance, and heights thereof are made uniform. Thereby, adjustment of a dispensing amount of the reagent can be easily performed.

The holder may detachably hold the reagent containers. In this reagent cartridge, since the holder detachably holds the reagent containers, each reagent can be filled in the reagent containers at a different place or a different timing and the reagent containers can be sealed. Thereby, when the reagents are filled in the reagent containers, contamination due to different reagents can be prevented.

Each of the reagent containers may include a cylindrical container main body part, and a container side fitting part formed on an outer circumferential surface of the container main body part, the holder may include a holder side fitting part formed in each of the opening parts, and the container side fitting part and the holder side fitting part may be loosely fitted in the vertical direction. In this reagent cartridge, the container side fitting part formed on the outer circumferential surface of the container main body part of the reagent container and the holder side fitting part formed in the opening part of the holder are loosely fitted in the vertical direction. Therefore, when the reagent container is loaded in the opening part of the holder, the reagent container can be held in a state in which the reagent container has an allowance in the vertical direction.

The container side fitting part may include a lower protruding part and an upper protruding part which protrude from the outer circumferential surface of the container main body part, the lower protruding part may be positioned below the upper protruding part in the vertical direction, the holder side fitting part may protrude from the opening part toward a center of the opening, and a distance in the vertical direction between the lower protruding part and the upper protruding part may be greater than a thickness in the vertical direction of the holder side fitting part. In this reagent cartridge, since the lower protruding part and the upper protruding part protrude from the outer circumferential surface of the container main body part and the holder side fitting part protrudes from the opening part toward the center of the opening, the holder side fitting part is fitted in a space between the lower protruding part and the upper protruding part of the container side fitting part when the reagent container is loaded in the opening part of the holder. In addition, since the distance in the vertical direction between the lower protruding part and the upper protruding part is greater than the thickness in the vertical direction of the holder side fitting part, when the holder side fitting part is fitted in the space between the lower protruding part and the upper protruding part, the container side fitting part and the holder side fitting part can be loosely fitted in the vertical direction. Then, the reagent container can be held with respect to the holder by locking the upper protruding part to the holder side fitting part.

The holder side fitting part may protrude from the entire circumference of the opening part toward the center of the opening. In this reagent cartridge, since the holder side fitting part protrudes from the entire circumference of the opening part toward the center of the opening, the container side fitting part and the holder side fitting part can be loosely fitted regardless of a direction of the reagent container with respect to the holder.

An outer surface of the lower protruding part may be an inclined surface which recedes from the container main body part upward in the vertical direction. In this reagent cartridge, since the outer surface of the lower protruding part is an inclined surface which recedes from the container main body part upward in the vertical direction, the reagent container is easily loaded in the opening part.

An inner circumferential surface of the holder side fitting part may be an inclined surface in which a diameter thereof becomes smaller downward in the vertical direction. In this reagent cartridge, since the inner circumferential surface of the holder side fitting part is an inclined surface in which the diameter becomes smaller downward in the vertical direction, the reagent container is easily loaded in the opening part.

The holder may include one or more wells which accommodate tips, and a sealing tape which seals the wells may be attached to the holder. In this reagent cartridge, the holder includes one or more wells which accommodate tips, and thus there is no need to separately prepare a tip. Moreover, since the sealing tape for sealing the wells is attached to the holder, the tips accommodated in the holder can be prevented from being contaminated or falling off.

The holder may include an identification region to which identification information is attached, and the sealing tape may also be attached to the identification region. In this reagent cartridge, since the sealing tape is also attached to the identification region of the holder, it is difficult to clearly read the identification information attached to the identification region by the genetic testing device or visual observation until the sealing tape is peeled off. Particularly, when an opaque tape is employed for the sealing tape, the identification information cannot be read due to the sealing tape. Therefore, since presence or absence of the sealing tape can be determined by reading the identification information, genetic testing being performed while the sealing tape is attached can be prevented.

Advantageous Effects of Invention

According to one aspect of the present invention, heights of the respective reagent containers can be made uniform when the reagent cartridge is set in a genetic testing device.

DESCRIPTION OF EMBODIMENTS

Figure 1:
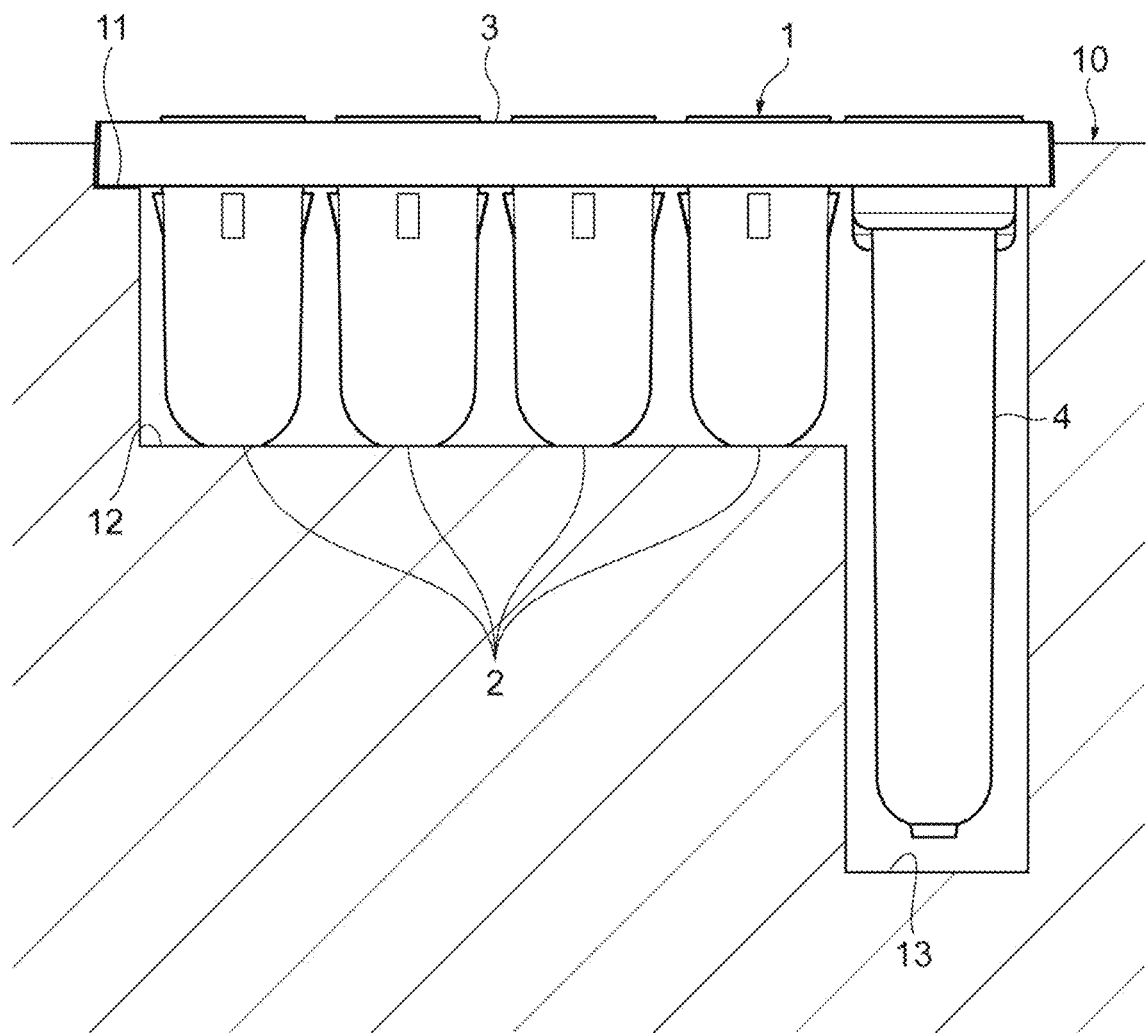
FIG. 1 is a view illustrating a state in which a reagent cartridge is set in a genetic testing device.
Figure 2:
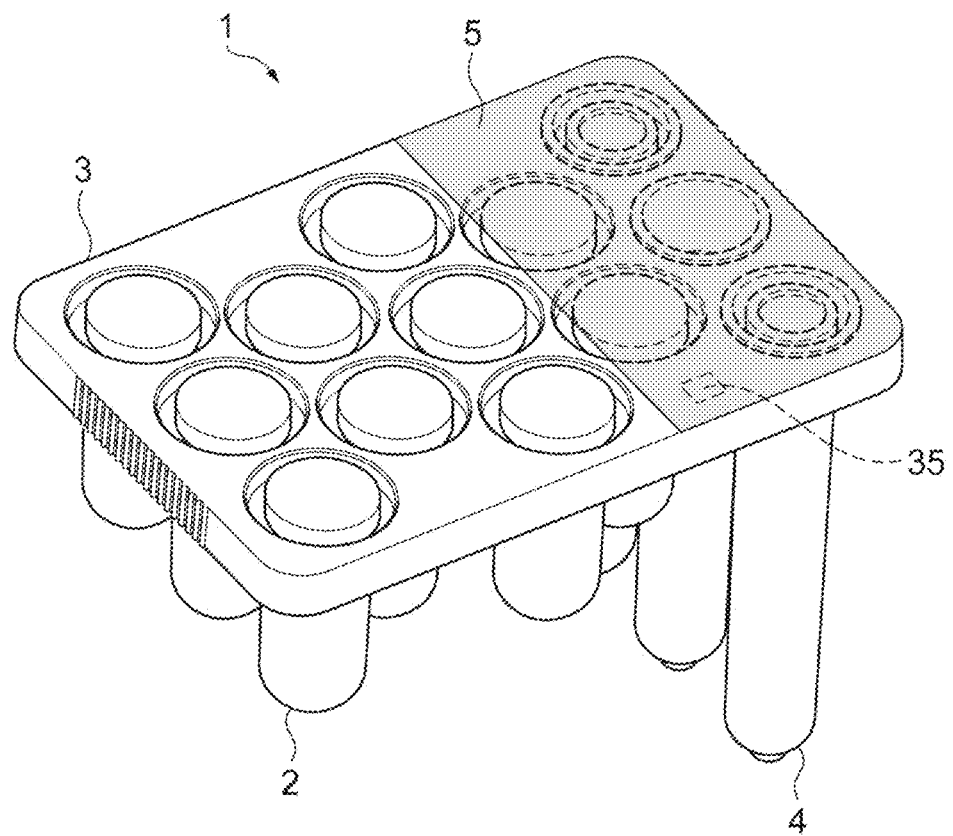
FIG. 2 is a perspective view illustrating a reagent cartridge of an embodiment.
Figure 3:
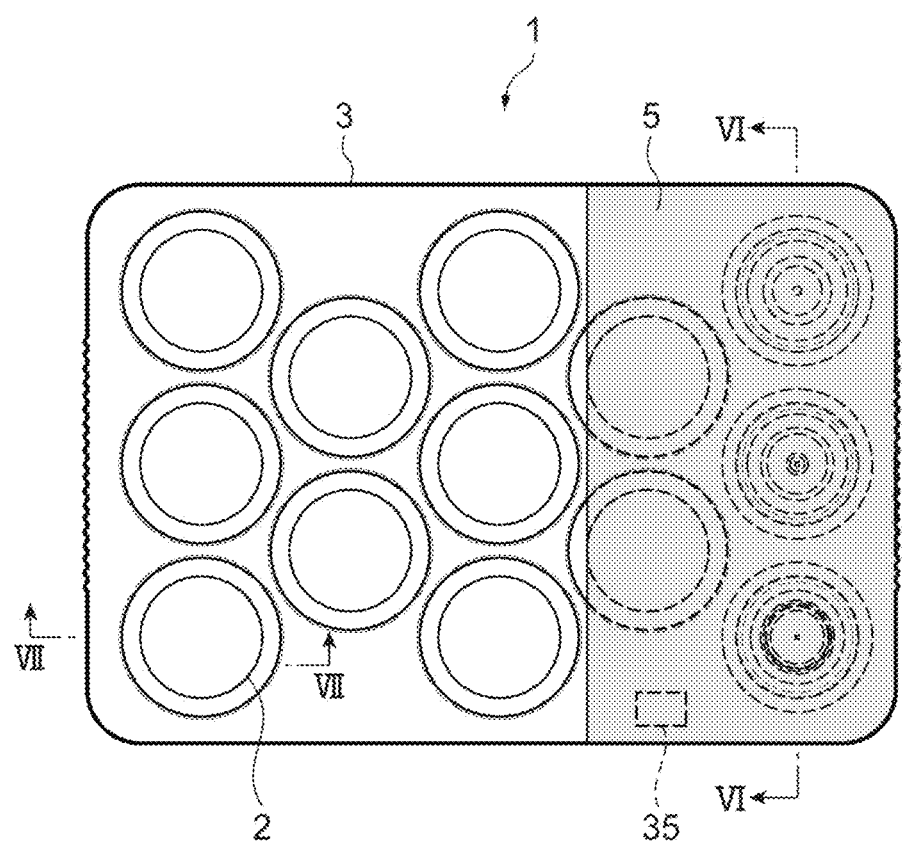
FIG. 3 is a plan view illustrating the reagent cartridge of the embodiment.
Figure 4:
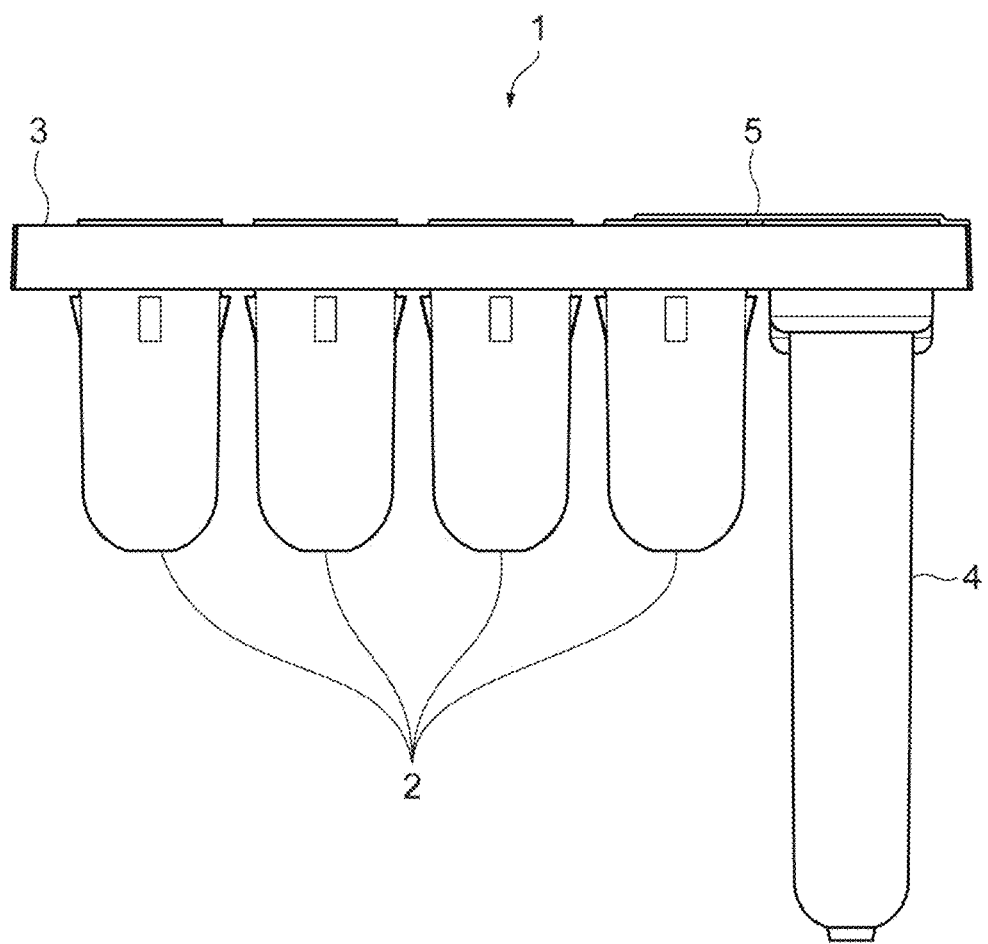
FIG. 4 is a front view illustrating the reagent cartridge of the embodiment.
Figure 5:
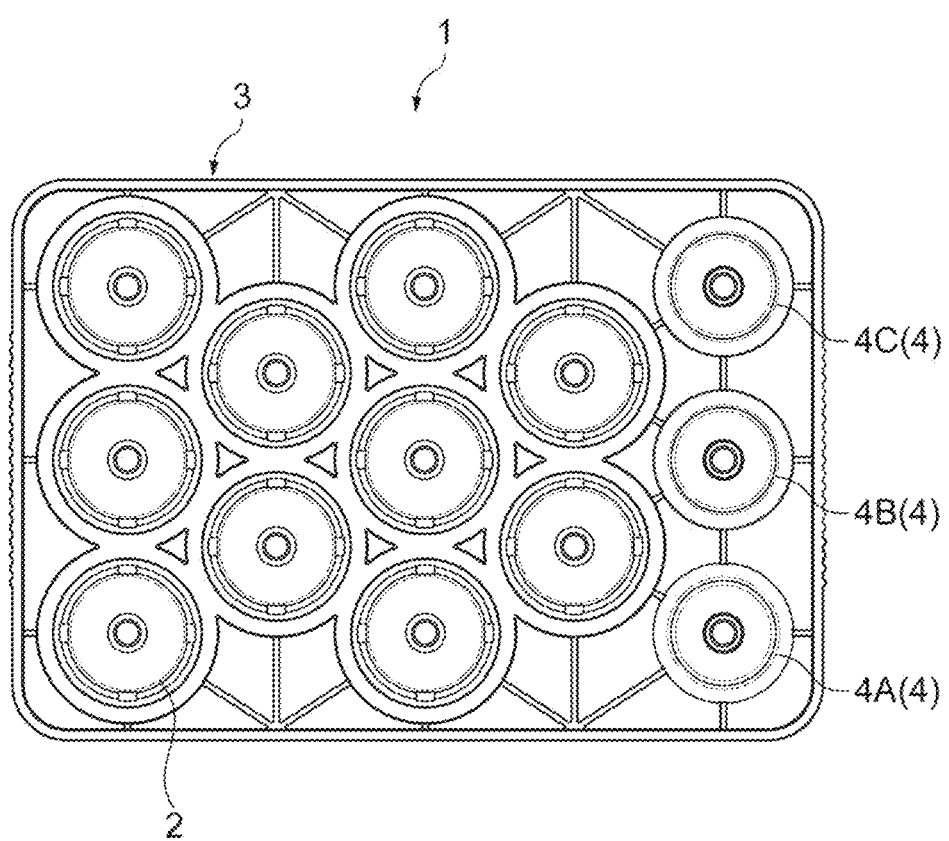
FIG. 5 is a bottom view illustrating the reagent cartridge of the embodiment.
Figure 6:
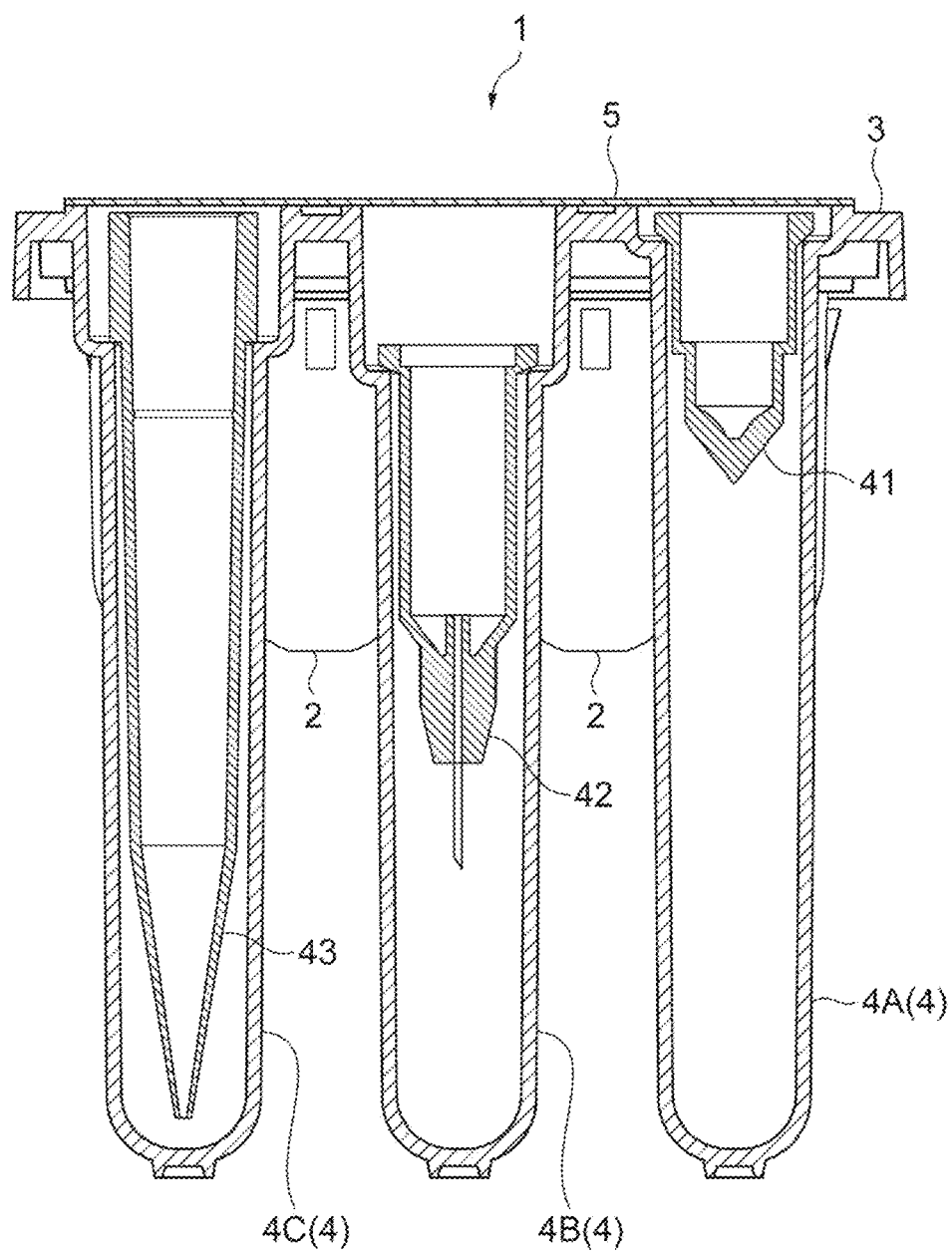
FIG. 6 is a cross-sectional view taken along line VI-VI illustrated in FIG. 3.
Figure 7:
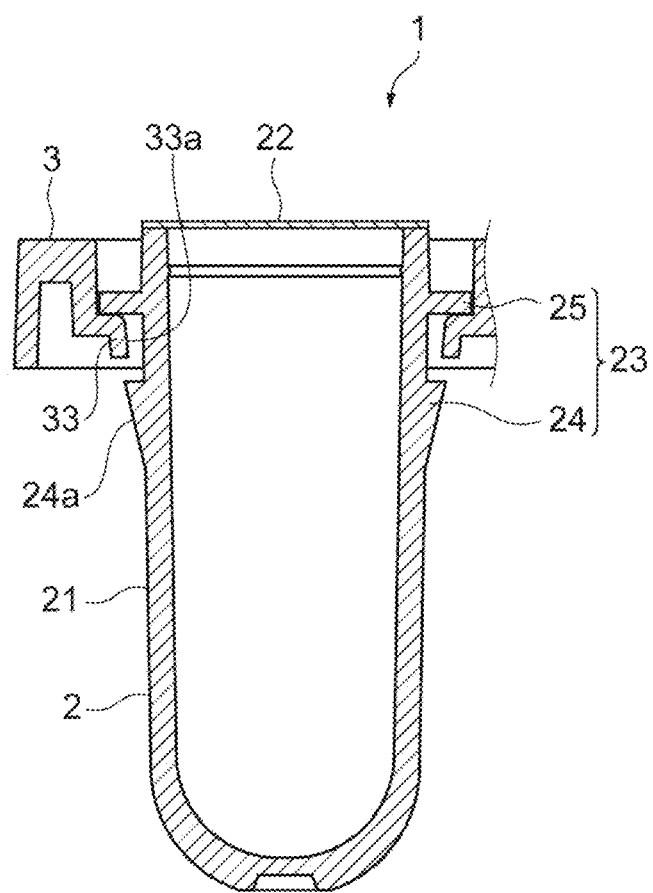
FIG. 7 is a cross-sectional view taken along line VII-VII illustrated in FIG. 3.
Figure 8:
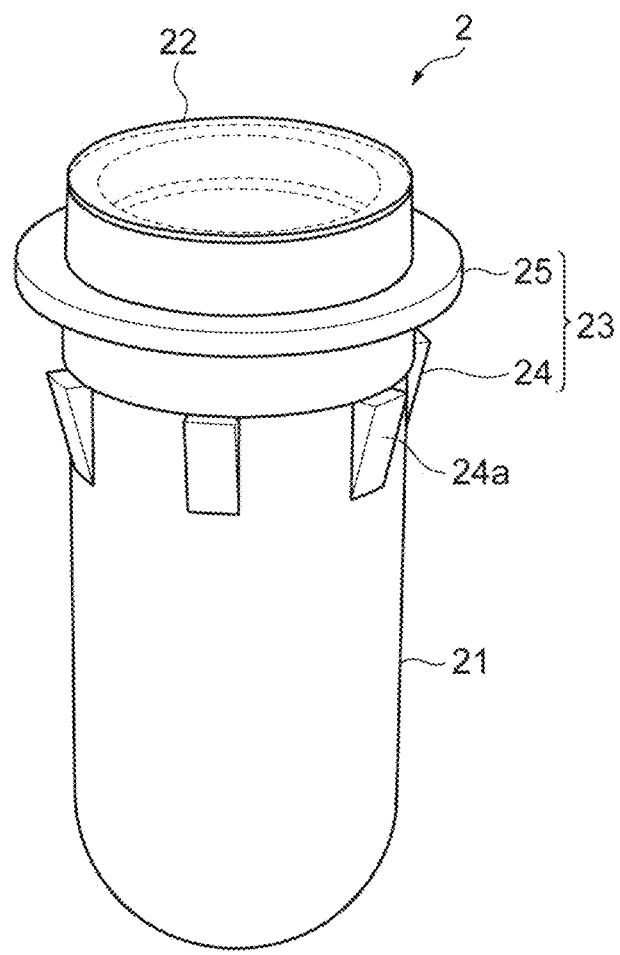
FIG. 8 is a perspective view illustrating a reagent container.
Figure 9:
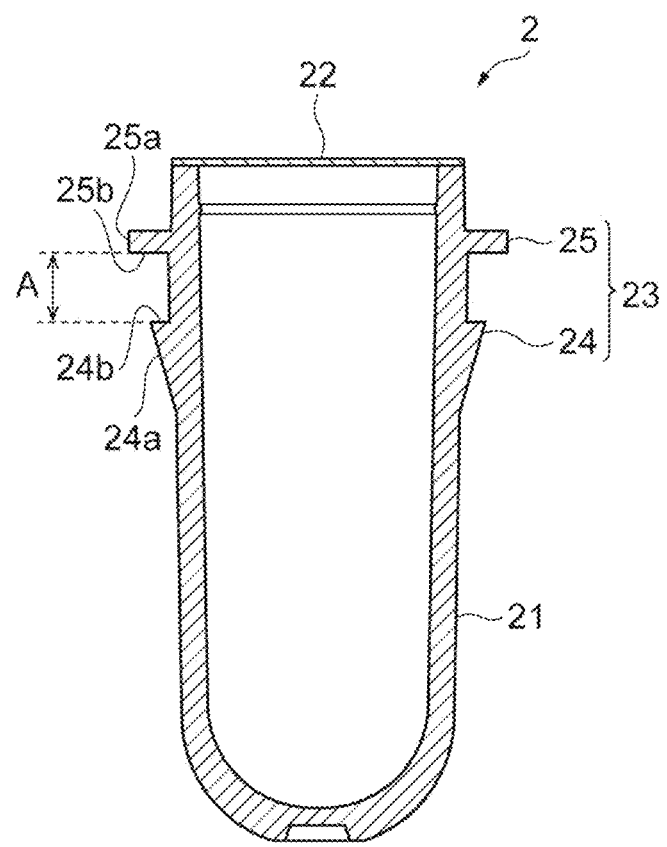
FIG. 9 is a longitudinal sectional view illustrating the reagent container.
Figure 10:
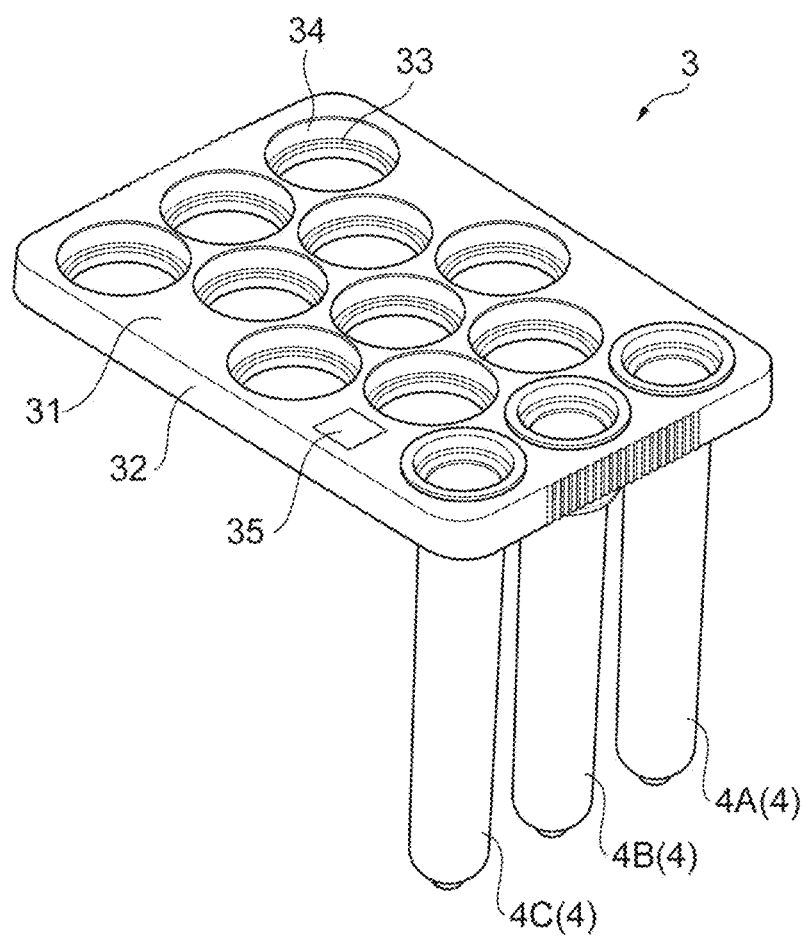
FIG. 10 is a perspective view of a holder from above.
Figure 11:
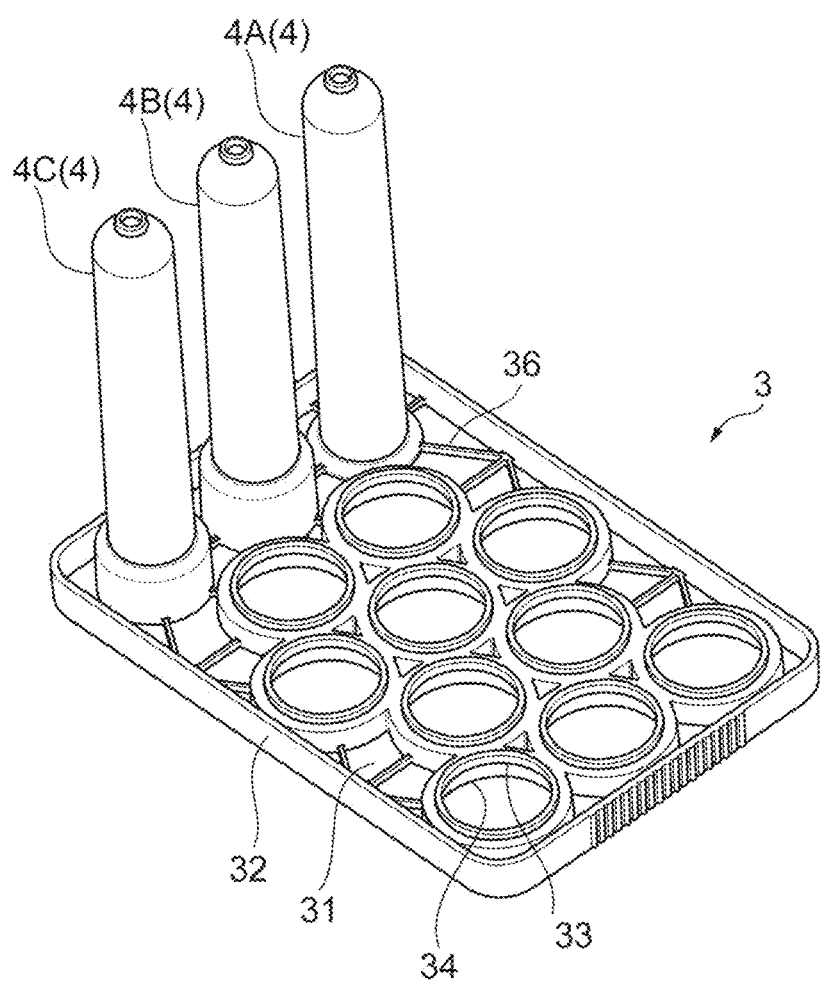
FIG. 11 is a perspective view of the holder from below.
Figure 12:
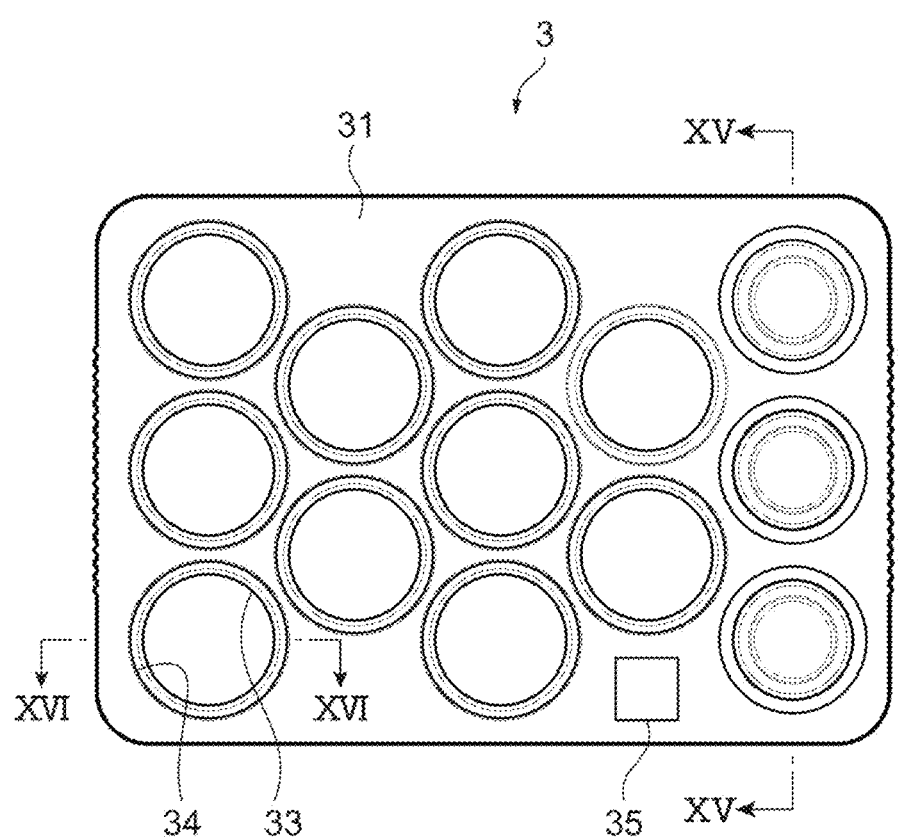
FIG. 12 is a plan view illustrating the holder.
Figure 13:
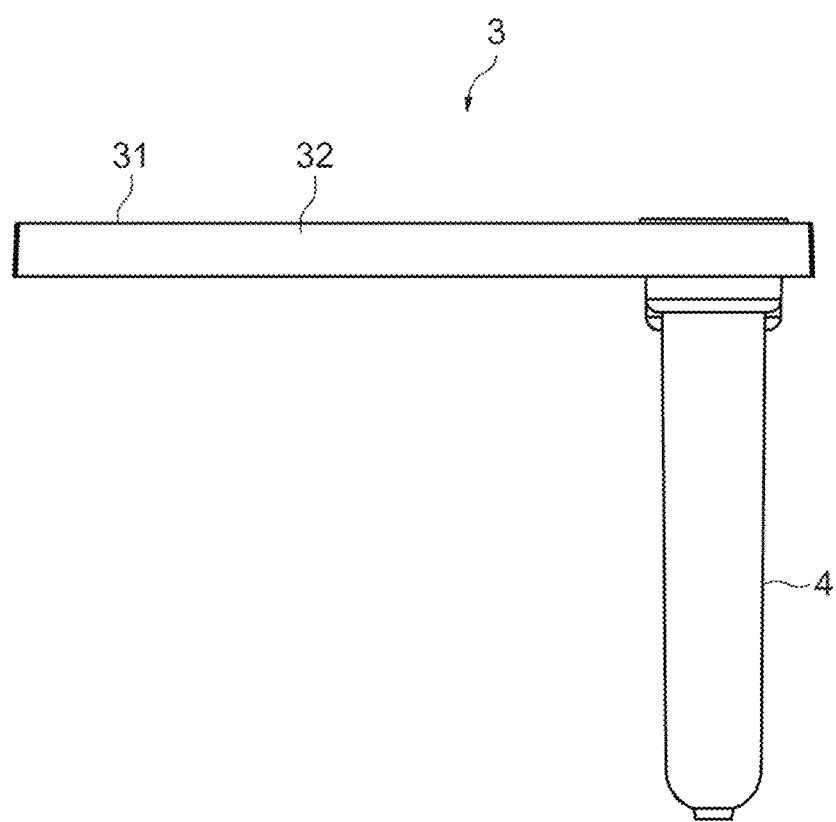
FIG. 13 is a front view illustrating the holder.
Figure 14:
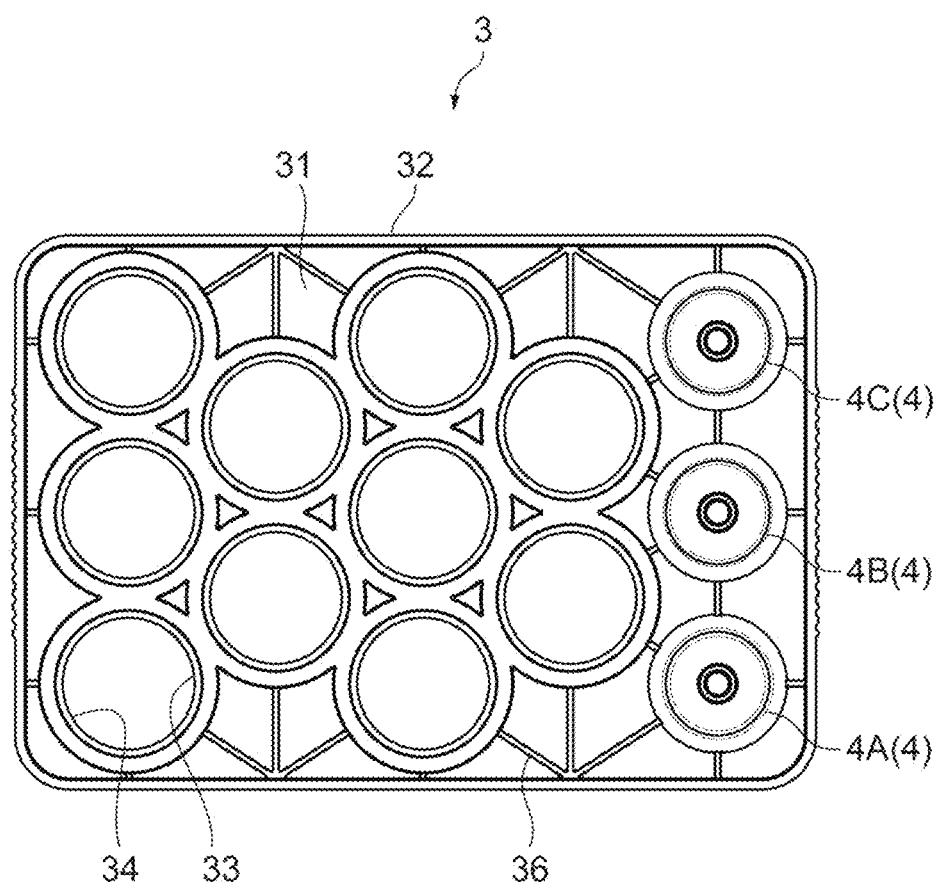
FIG. 14 is a bottom view illustrating the holder.
Figure 15:
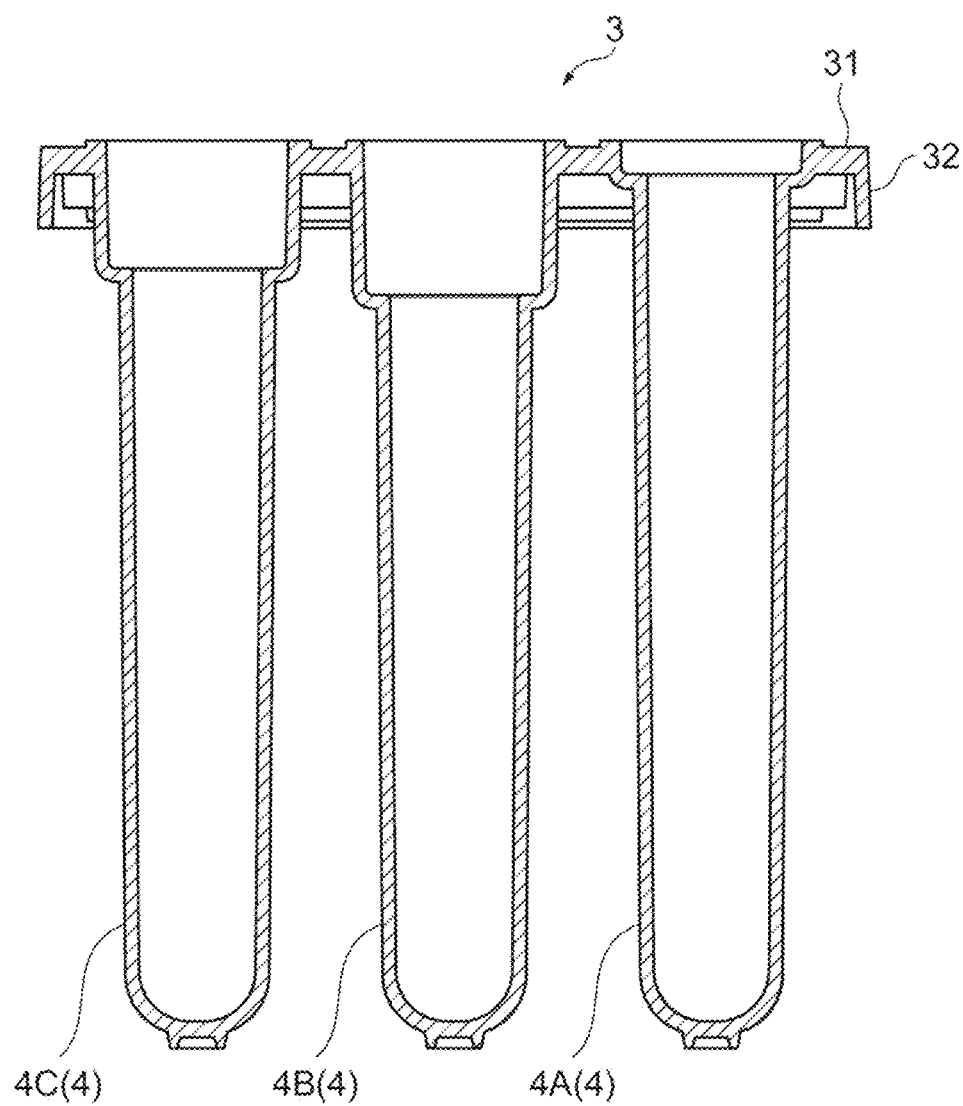
FIG. 15 is a cross-sectional view taken along line XV-XV illustrated in FIG. 12.
Figure 16:
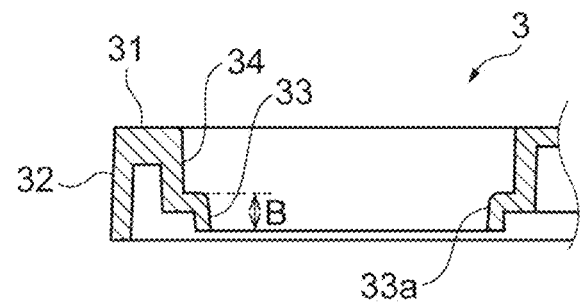
FIG. 16 is a cross-sectional view taken along line XVI-XVI illustrated in FIG. 12.

Hereinafter, an embodiment of a reagent cartridge according to one aspect of the present invention will be described with reference to the drawings. The reagent cartridge according to the embodiment is a reagent cartridge set in a genetic testing device for pretreatment of genetic testing. In the drawings, the same or corresponding elements are denoted by the same reference signs, and duplicate description thereof will be omitted.

[Reagent Cartridge]

As illustrated in FIGS. 1 to 7, a reagent cartridge 1 of the present embodiment is set in a genetic testing device 10 to perform an extraction and purification step which is pretreatment of genetic testing. The reagent cartridge 1 includes a plurality of reagent containers 2 in which a reagent (pretreatment reagent) is filled, a holder 3 which holds the reagent containers 2, a plurality of wells 4 in which tips of various types are accommodated, and a sealing tape 5 attached to the holder 3. In the following description, a vertical direction of the reagent cartridge 1 is a vertical direction in a state in which the reagent cartridge 1 is set in the genetic testing device 10.

[Genetic Testing Device]

As illustrated in FIG. 1, the genetic testing device 10 is a device for performing steps including an "extraction and purification step" in which a nucleic acid of a target gene is extracted and purified from an analyte, an "amplification step" in which the nucleic acid extracted and purified in the extraction and purification step is amplified, and a "detection step" in which the nucleic acid amplified in the amplification step is tested. A reaction tube (not illustrated) into which an analyte and an extraction liquid are injected, the reagent cartridge 1 of the present embodiment having the plurality of reagent containers in which a reagent is filled, and a microchip (not illustrated) in which a reagent (reaction reagent) to be reacted with (amplifying) a nucleic acid of a target gene in the plurality of wells is enclosed are set in the genetic testing device 10.

As a mechanism for setting the reagent cartridge 1, the genetic testing device 10 includes a holder locking part 11 that locks the holder 3, a reagent container accommodating part 12 that accommodates the plurality of reagent containers 2, and a well accommodating part 13 that accommodates the plurality of wells 4. The reagent containers 2 are accommodated in the reagent container accommodating part 12 in a state in which they are in contact with a bottom surface of the reagent container accommodating part 12. The wells 4 are accommodated in the well accommodating part 13 in a state in which they are spaced apart from a bottom surface of the well accommodating part 13.

In genetic testing using the genetic testing device 10, first, a sample solution in which a nucleic acid of a target gene is extracted and purified is generated by dispensing each reagent filled in the reagent cartridge 1 into the reaction tube (extraction and purification step). Next, the nucleic acid is amplified by injecting the sample solution into a microchip to mix the sample solution and the reagent and performing incubation at a predetermined temperature (amplification step). Next, the nucleic acid amplified in the amplification step is detected by confirming presence or absence of an amplification product in the microchip (detection step).

[Reagent Container]

As illustrated in FIGS. 2 to 9, the reagent container 2 is a container in which a reagent is filled. The plurality of reagent containers 2 may be filled with the same reagent or may each be filled with a different reagent. As the reagent filled in the reagent containers 2, a surfactant, an acid, an alkali, a pH buffer solution, a magnetic particle liquid, or the like can be exemplified.

The reagent container 2 includes a container main body part 21, a lid part 22, and a container side fitting part 23.

The container main body part 21 is a part that functions as a container in which a reagent is filled. The container main body part 21 is formed of a resin in a cylindrical shape. As a resin for forming the container main body part 21, for example, PP (polypropylene), PE (polyethylene), an ABS resin (acrylonitrile-butadiene-styrene copolymer resin), PET (polyethylene terephthalate), or the like may be used. One end (the upper end) of the container main body part 21 is an opening that opens upward, and the other end (the lower end) of the container main body part 21 is a round bottom. Dimensions of the container main body part 21 are not particularly limited. For example, a thickness of the container main body part 21 may be about 1 mm, an outer diameter of the container main body part 21 may be about 10 mm, an inner diameter of the container main body part 21 may be about 8 mm, and a length in a vertical direction (a length in a vertical direction in FIG. 9) of the container main body part 21 may be about 30 mm.

The lid part 22 is a part that seals a reagent filled in the container main body part 21. The lid part 22 may have any shape, be formed of any material, or the like as long as it can seal the opening formed at the upper end of the container main body part 21. For example, the lid part 22 may be formed of an aluminum sheet in a circular shape having an outer diameter greater than the outer diameter of the container main body part 21. Further, the lid part 22 seals the container main body part 21 in a state in which a reagent is filled in the container main body part 21 by being adhered to an upper end surface of the container main body part 21 with an adhesive or the like.

The container side fitting part 23 is a part loosely fitted to the holder 3 in the vertical direction. The container side fitting part 23 is formed on an outer circumferential surface of the container main body part 21. The container side fitting part 23 is integrally formed with the container main body part 21 and is formed of the same resin as the container main body part 21. The container side fitting part 23 includes a lower protruding part 24 and an upper protruding part 25 which protrude from the outer circumferential surface of the container main body part 21.

The lower protruding part 24 is positioned below the upper protruding part 25. The lower protruding part 24 is formed in a triangular shape in a longitudinal sectional surface passing through a central axis of the container main body part 21. An outer surface 24a of the lower protruding part 24 is an inclined surface which recedes from the container main body part 21 upward. That is, a protrusion height of the lower protruding part 24 from the outer circumferential surface of the container main body part 21 increases upward. The outer surface 24a of the lower protruding part 24 is an outermost surface of the lower protruding part 24 in a radial direction of the container main body part 21. An upper surface 24b, which is a surface on an upper side (on the upper protruding part 25 side) of the lower protruding part 24, is a horizontal surface perpendicular to a direction in which the container main body part 21 extends.

The lower protruding part 24 may be formed in an annular shape over the entire circumference of the container side fitting part 23, but in order for it to be more easily fitted to the holder 3, the lower protruding part 24 is preferably formed only in a portion in a circumferential direction of the container side fitting part 23. In the latter case, only one lower protruding part 24 may be formed in the circumferential direction of the container side fitting part 23, but in view of preventing the holder 3 from falling off, a plurality of lower protruding parts 24 are preferably formed in the circumferential direction of the container side fitting part 23. In description of the present embodiment, it will be assumed that the lower protruding part 24 is formed only in a portion in the circumferential direction of the container side fitting part 23 and four lower protruding parts 24 are formed at regular intervals (at equiangular intervals) in the circumferential direction of the container side fitting part 23.

The upper protruding part 25 is positioned above the lower protruding part 24. The upper protruding part 25 is formed in a rectangular shape in a longitudinal sectional surface passing through the central axis of the container main body part 21. An outer surface 25a of the upper protruding part 25 is a surface parallel to the central axis of the container main body part 21. A protrusion height of the upper protruding part 25 from the outer circumferential surface of the container main body part 21 is higher than a protrusion height of the lower protruding part 24 from the outer circumferential surface of the container main body part 21. That is, the outer surface 25a of the upper protruding part 25 is at a position further away from the outer circumferential surface of the container main body part 21 (from the central axis of the container main body part 21) with respect to the outer surface 24a of the lower protruding part 24. Therefore, with the central axis of the container main body part 21 as a center, a diameter of a circle passing through a position of the upper protruding part 25 farthest from the central axis of the container main body part 21 is greater than a diameter of a circle passing through a position of the lower protruding part 24 farthest from the central axis of the container main body part 21. A lower surface 25b, which is a surface on a lower side (on the lower protruding part 24 side) of the upper protruding part 25, is a horizontal surface perpendicular to the direction in which the container main body part 21 extends, that is, a surface parallel to the upper surface 24b of the lower protruding part 24.

The upper protruding part 25 may be formed only in a portion in the circumferential direction of the container side fitting part 23, but in order for it be more easily held by the holder 3, the upper protruding part 25 is preferably formed in an annular shape over the entire circumference of the container side fitting part 23. In the present embodiment, the upper protruding part 25 is described as being formed in an annular shape over the entire circumference of the container side fitting part 23.

[Holder]

As illustrated in FIGS. 2 to 7 and FIGS. 10 to 16, the holder 3 is a holding member detachably holding the plurality of reagent containers 2. The holder 3 includes a top plate part 31, a side plate part 32, and a holder side fitting part 33. The top plate part 31, the side plate part 32, and the holder side fitting part 33 are integrally formed of the same resin. As a resin for forming the top plate part 31, the side plate part 32, and the holder side fitting part 33, for example, PP (polypropylene), PE (polyethylene), an ABS resin (acrylonitrile-butadiene-styrene copolymer resin), PET (polyethylene terephthalate), or the like may be used.

The top plate part 31 is formed in a rectangular thin plate shape. A plurality of opening parts 34 into which a plurality of reagent containers 2 are loaded (inserted) are formed on the top plate part 31. Each of the opening parts 34 is a part in which a through hole is formed in the top plate part 31. The opening part 34 extends in a direction perpendicular to the top plate part 31. A direction perpendicular to the top plate part 31 is a vertical direction and is also a direction in which the reagent container 2 is loaded. The number and arrangement of the opening parts 34 are not particularly limited. For example, the opening parts 34 may be formed in the top plate part 31 according to the number of reagents to be dispensed with respect to one analyte. Also, in view of suppressing an increase in size of the holder 3, it is preferable that the plurality of opening parts 34 be formed in a short-side direction and a long-side direction of the top plate part 31. In this case, in view of reducing a length in the long-side direction of the top plate part 31, when a group of opening parts 34 arranged in the short-side direction of the top plate part 31 is assumed to be an opening part 34 group, the opening part 34 groups adjacent to each other in the long-side direction of the top plate part 31 are preferably disposed to be mutually offset in the short-side direction of the top plate part 31. In the present embodiment, the number of opening parts 34 in the opening part 34 group is configured to be two, three, two, and three in the long-side direction of the top plate part 31.

An identification region 35 to which identification information is attached is provided on an upper surface of the top plate part 31 in a region in which the opening parts 34 are not formed. As the identification information attached to the identification region 35, for example, an identification number of the reagent cartridge 1, information on a reagent to be held, information on the mountable genetic testing device 10, an expiration date, a serial number, or the like can be exemplified. In the identification region 35, identification information may be attached as text, and in order for it to be distinguishable to the genetic testing device 10, the identification information may be attached as a code such as a QR code (registered trademark). In order to make it easy to see a position of the identification region 35 in the top plate part 31, regions other than the identification region 35 on the upper surface of the top plate part 31 may be subjected to a surface roughening process such as emboss processing, and the identification region 35 may not be subjected to the surface roughening process.

A rib part 36 for reinforcing the top plate part 31 is formed on a lower surface of the top plate part 31. The rib part 36 is formed to protrude from the lower surface of the top plate part 31. Further, a shape, a disposition, and the like of the rib part 36 are not particularly limited and can be set as appropriate. For example, the rib part 36 may be formed to connect the side plate part 32 and the opening part 34.

The side plate part 32 is a part that enhances the rigidity of the top plate part 31 and is configured to be locked to the holder locking part 11 of the genetic testing device 10. The side plate part 32 extends downward in a direction perpendicular to the top plate part 31 from an outer circumferential end of the top plate part 31. A lower end edge of the side plate part 32 is positioned on the same plane (on the same horizontal plane) parallel to the top plate part 31 over the entire circumference.

The holder side fitting part 33 is a part that is loosely fitted to the container side fitting part 23 of the reagent container 2 in the vertical direction. The holder side fitting part 33 is formed in the opening part 34. The holder side fitting part 33 protrudes from the opening part 34 toward a center of the opening. In this case, in view of appropriately holding the reagent container 2, the holder side fitting part 33 preferably protrudes from the entire circumference of the opening part 34 toward the center of the opening to be formed in an annular shape. As described above, since the opening part 34 extends in a direction perpendicular to the top plate part 31, the holder side fitting part 33 may be formed at any position in a direction in which the opening part 34 extends. In this case, in view of reducing an amount of protrusion of the reagent container 2 with respect to the top plate part 31, the holder side fitting part 33 is preferably formed at a position retracted from the top plate part 31.

An inner diameter of the holder side fitting part 33 is slightly smaller than an outer diameter of the lower protruding part 24 of the container side fitting part 23. Therefore, when the reagent container 2 is loaded in the opening part 34, the lower protruding part 24 and the holder side fitting part 33 are elastically deformed, and thereby the lower protruding part 24 can pass through the holder side fitting part 33. Further, a relationship between the inner diameter of the holder side fitting part 33 and the outer diameter of the lower protruding part 24 can be appropriately set in a range in which the lower protruding part 24 and the holder side fitting part 33 are elastically deformed so that the lower protruding part 24 can pass through the holder side fitting part 33 when the reagent container 2 is loaded in the opening part 34. Here, the inner diameter of the holder side fitting part 33 is a diameter of a circle passing a position of the holder side fitting part 33 closest to a central axis of the opening part 34 with the central axis of the opening part 34 as a center. Also, the outer diameter of the lower protruding part 24 of the container side fitting part 23 is a diameter of a circle passing a position of the lower protruding part 24 farthest from the central axis of the container main body part 21 with the central axis of the container main body part 21 as a center.

As described above, the protrusion height of the upper protruding part 25 from the outer circumferential surface of the container main body part 21 is higher than the protrusion height of the lower protruding part 24 from the outer circumferential surface of the container main body part 21.

Further, when the reagent container 2 is loaded in the opening part 34, the lower protruding part 24 can pass through the holder side fitting part 33, but the upper protruding part 25 cannot pass through the holder side fitting part 33. Thereby, the holder 3 can hold the reagent container 2. Further, a relationship between the inner diameter of the holder side fitting part 33 and an outer diameter of the upper protruding part 25 can be appropriately set in a range in which the upper protruding part 25 can be prevented from passing through the holder side fitting part 33 when the reagent container 2 is loaded in the opening part 34. Here, the outer diameter of the upper protruding part 25 of the container side fitting part 23 is a diameter of a circle passing a position of the upper protruding part 25 farthest from the central axis of the container main body part 21 with the central axis of the container main body part 21 as a center.

A distance A (see FIG. 9) in the vertical direction between the lower protruding part 24 and the upper protruding part 25 is greater than a thickness B (see FIG. 16) in the vertical direction of the holder side fitting part 33. Further, the distance A between the lower protruding part 24 and the upper protruding part 25 is a distance between the upper surface 24b of the lower protruding part 24 and the lower surface 25b of the upper protruding part 25. Thereby, when the container side fitting part 23 and the holder side fitting part 33 are fitted, since the container side fitting part 23 and the holder side fitting part 33 are loosely fitted in the vertical direction, the holder 3 can hold the reagent container 2 with a predetermined allowance in the vertical direction.

An inner circumferential surface 33a of the holder side fitting part 33 is an inclined surface in which a diameter thereof becomes smaller downward. That is, the inner circumferential surface 33a of the holder side fitting part 33 is an inclined surface that approaches the central axis of the opening part 34 downward.

[Wells]

As illustrated in FIGS. 2 to 7 and 10 to 16, the wells 4 accommodates tips of various types. The wells 4 are configured of a first well 4A, a second well 4B, and a third well 4C. In the first well 4A, a piercing tip 41 for breaking the lid part 22 of the reagent container 2 and taking off a seal of the reagent container 2 is accommodated. In the second well 4B, an injection tip 42 for injecting a sample solution extracted and purified in a reaction tube into a microchip is accommodated. In the third well 4C, a pipette tip 43 for dispensing a reagent filled in each reagent container 2 into a reaction tube is accommodated.

The first well 4A, the second well 4B and the third well 4C are integrally molded with the holder 3 and are formed of the same resin as the holder 3. A disposition of the first well 4A, the second well 4B and the third well 4C in the holder 3 is not particularly limited, but in view of facilitating transport of the tips of various types in the genetic testing device 10, the first well 4A, the second well 4B and the third well 4C may be disposed at one end portion in a longitudinal direction of the top plate part 31 of the holder 3. In this case, the first well 4A, the second well 4B, and the third well 4C may be arranged in a line in the short-side direction of the top plate part 31.

[Sealing Tape]

As illustrated in FIGS. 2 to 4 and 6, the sealing tape 5 is a tape for sealing the wells 4. The sealing tape 5 is attached to the top plate part 31 to cover the first well 4A, the second well 4B, and the third well 4C. Further, the sealing tape 5 is attached to the top plate part 31 to cover the identification region 35 as well. In the present embodiment, the sealing tape 5 is attached to cover all of the first well 4A, the second well 4B, the third well 4C, and the identification region 35 and a portion of the opening parts 34 in which the reagent containers 2 are loaded. The sealing tape 5 may be made of any material as long as it can seal the wells 4 but is preferably opaque in view of hiding identification information attached to the identification region 35.

[Method of Using Reagent Cartridge]

As advance preparation, first, reagents are dispensed to the plurality of reagent containers 2 for each reagent and the reagent containers 2 are sealed. Thereby, contamination of the reagents due to splashing or the like can be prevented.

Next, each of the reagent containers 2 filled with the reagent is loaded in the opening part 34 of the holder 3. At this time, the lower protruding part 24 and the holder side fitting part 33 are elastically deformed, and the lower protruding part 24 passes through the holder side fitting part 33. Also, the lower protruding part 24 rides over the holder side fitting part 33 while being guided by the inner circumferential surface 33a of the holder side fitting part 33 which is an inclined surface. Also, the holder side fitting part 33 rides over the lower protruding part 24 while being guided by the outer surface 24a of the lower protruding part 24 which is an inclined surface. Thereby, the holder side fitting part 33 is fitted into a space between the lower protruding part 24 and the upper protruding part 25. Then, the upper protruding part 25 is locked to the holder side fitting part 33 so that the reagent container 2 is held by the holder 3.

Next, the piercing tip 41, the injection tip 42 and the pipette tip 43 are respectively accommodated in the first well 4A, the second well 4B, and the third well 4C, and the sealing tape 5 is attached to the top plate part 31 of the holder 3. Thereby, the piercing tip 41, the injection tip 42, and the pipette tip 43 are respectively enclosed in the first well 4A, the second well 4B, and the third well 4C, and the identification region 35 is hidden.

At the time of use of the reagent cartridge 1, the sealing tape 5 is first peeled off to take off seals of the first well 4A, the second well 4B, and the third well 4C and to expose the identification region 35. Thereby, the piercing tip 41, the injection tip 42, and the pipette tip 43 can be respectively taken out of the first well 4A, the second well 4B, and the third well 4C. Also, the identification information attached to the identification region 35 can be read by the genetic testing device 10.

Figure 17:
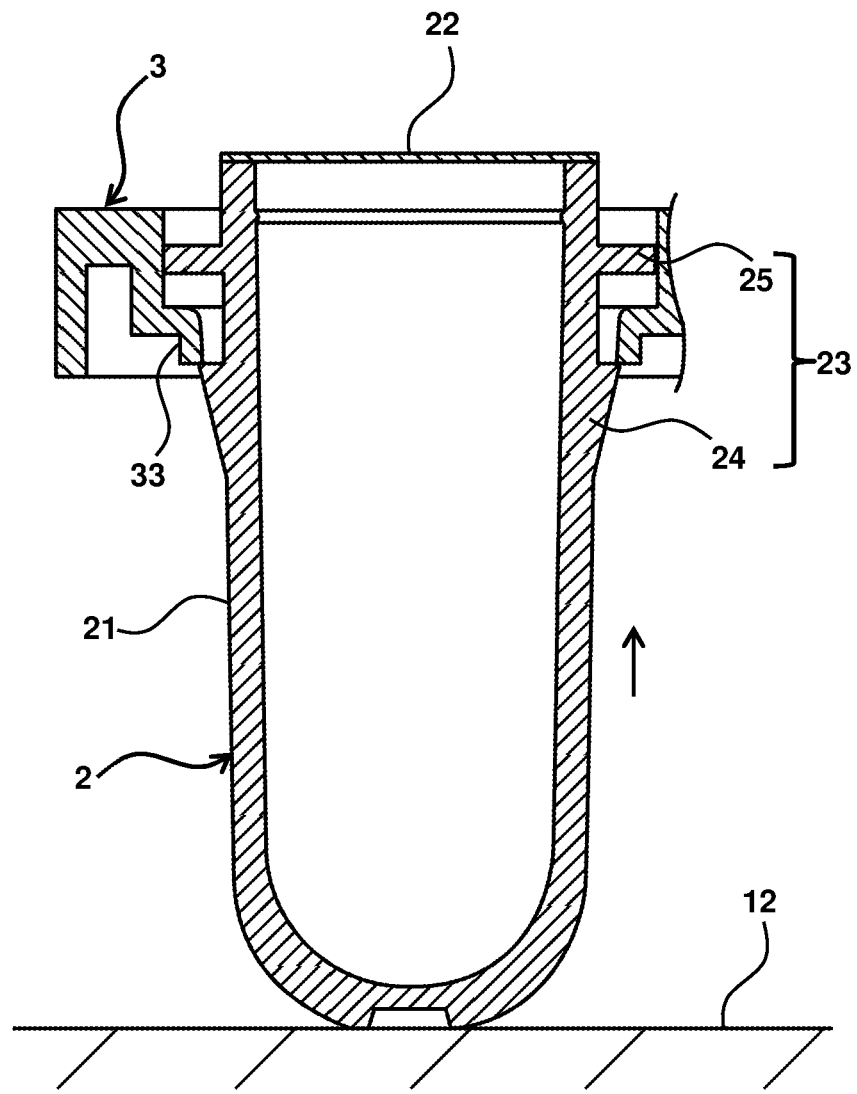
FIG. 17 is a partial view of a state in which the reagent cartridge is set in the genetic testing device.

Next, a reaction tube, the reagent cartridge 1, and a microchip are set in the genetic testing device 10. At this time, as illustrated in FIGS. 1 and 17, each of the reagent containers 2 of the reagent cartridge 1 is in contact with the bottom surface of the reagent container accommodating part 12 of the genetic testing device 10. Since the holder 3 holds the reagent container 2 with an allowance in the vertical direction, the reagent container 2 moves in the vertical direction by an amount corresponding to the allowance in the vertical direction. Thereby, heights of the respective reagent containers 2 are made uniform.

Next, the extraction and purification step, the amplification step, and the detection steps are performed by the genetic testing device 10. In the extraction and purification step, the genetic testing device 10 first breaks the lid part of the reagent container 2 using the piercing tip 41 taken out of the first well 4A and takes off the seal of the reagent container 2. Next, the genetic testing device 10 dispenses the reagent filled in the reagent container 2 into the reaction tube using the pipette tip 43 taken out of the third well 4C. Next, the genetic testing device 10 injects a sample solution extracted and purified in the reaction tube into the microchip using the injection tip 42 taken out of the second well 4B.

As described above, in the reagent cartridge 1 according to the present embodiment, since the holder 3 holds the reagent containers 2 with an allowance in the vertical direction, each of the reagent containers 2 can move in the vertical direction within a range of the allowance. Therefore, when the reagent cartridge 1 is set in the genetic testing device 10 and the reagent containers 2 are brought into contact with the bottom surface of the reagent container accommodating part 12 of the genetic testing device 10, the reagent containers 2 move in the vertical direction within the allowance range, and heights thereof are made uniform. Thereby, adjustment of a dispensing amount of the reagent can be easily performed.

Also, since the holder 3 detachably holds the reagent containers 2, each reagent can be filled in the reagent containers 2 at a different place or a different timing and the reagent containers 2 can be sealed. Thereby, when the reagents are filled in the reagent containers 2, contamination due to different reagents can be prevented.

Also, the container side fitting part 23 formed on the outer circumferential surface of the container main body part 21 of the reagent container 2 and the holder side fitting part 33 formed in the opening part 34 of the holder 3 are loosely fitted in the vertical direction. Therefore, when the reagent container 2 is loaded in the opening part 34 of the holder 3, the reagent container 2 can be held in a state in which the reagent container 2 has an allowance in the vertical direction.

Also, since the lower protruding part 24 and the upper protruding part 25 protrude from the outer circumferential surface of the container main body part 21 and the holder side fitting part 33 protrudes from the opening part 34 toward the center of the opening, the holder side fitting part 33 is fitted into a space between the lower protruding part 24 and the upper protruding part 25 of the container side fitting part 23 when the reagent container 2 is loaded in the opening part 34 of the holder 3. In addition, since the distance A in the vertical direction between the lower protruding part 24 and the upper protruding part 25 is greater than the thickness B in the vertical direction of the holder side fitting part 33, when the holder side fitting part 33 is fitted into the space between the lower protruding part 24 and the upper protruding part 25, the container side fitting part 23 and the holder side fitting part 33 can be loosely fitted in the vertical direction. Then, the reagent container 2 can be held with respect to the holder 3 by locking the upper protruding part 25 to the holder side fitting part 33.

Also, since the holder side fitting part 33 protrudes from the entire circumference of the opening part 34 toward the center of the opening, the container side fitting part 23 and the holder side fitting part 33 can be loosely fitted regardless of a direction of the reagent container 2 with respect to the holder 3.

Also, since the outer surface 24a of the lower protruding part 24 is an inclined surface which recedes from the container main body part 21 upward, the reagent container 2 is easily loaded in the opening part 34.

Also, since the inner circumferential surface 33a of the holder side fitting part 33 is an inclined surface in which the diameter becomes smaller downward, the reagent container 2 is easily loaded in the opening part 34.

Also, since the holder 3 includes the wells 4 (the first well 4A, the second well 4B, and the third well 4C) in which the piercing tip 41, the injection tip 42, and the pipette tip 43 are accommodated, there is no need to separately prepare the piercing tip 41, the injection tip 42, and the pipette tip 43. Moreover, since the sealing tape 5 for sealing the wells 4 is attached to the holder 3, the piercing tip 41, the injection tip 42, and the pipette tip 43 accommodated in the holder 3 can be prevented from being contaminated or falling off.

Also, since the sealing tape 5 is also attached to the identification region 35 of the holder 3, it is difficult to clearly read identification information attached to the identification region 35 by the genetic testing device 10 or visual observation until the sealing tape 5 is peeled off. Particularly, when an opaque tape is employed for the sealing tape 5, the identification information cannot be read due to the sealing tape 5. Therefore, since presence or absence of the sealing tape 5 can be determined by reading the identification information, genetic testing being performed while the sealing tape 5 is attached can be prevented.

Although embodiments of the present invention have been described above, the present invention is not limited to the above-described embodiments.

For example, the mode in which the holder holds the reagent container with an allowance in the vertical direction is not limited to the above-described embodiment. For example, it may be achieved by fitting the protruding part formed on the outer circumferential surface of the container main body part into a space between a pair of upper and lower protruding parts formed in the opening part of the holder. Also, it may be achieved by fitting a rod-shaped protruding part formed on the outer circumferential surface of the container main body part into a vertically extending groove formed in the opening part of the holder.

Also, the holder may not necessarily hold the reagent container in a detachable manner as long as the reagent container can be held with an allowance in the vertical direction, and the holder may hold the reagent container in a non-detachable manner. Even with such a configuration, heights of the respective reagent containers can be made uniform when the reagent cartridge is set in the genetic testing device.

REFERENCE SIGNS LIST

1 Reagent cartridge
2 Reagent container
3 Holder
4 Well
4A First well
4B Second well
4C Third well
5 Sealing tape
10 Genetic testing device
11 Holder locking part
12 Reagent container accommodating part
13 Well accommodating part
21 Container main body part
22 Lid part
23 Container side fitting part
24 Lower protruding part
24a Outer surface
24b Upper surface
25 Upper protruding part
25a Outer surface
25b Lower surface
31 Top plate part
32 Side plate part
33 Holder side fitting part
33a Inner circumferential surface
34 Opening part
35 Identification region
36 Rib part 41 Piercing tip
42 Injection tip
43 Pipette tip
A Distance between lower protruding part 24 and upper protruding part 25 in vertical direction
B Thickness of holder side fitting part 33 in vertical direction

The invention claimed is:

1. A reagent cartridge configured to be set in a genetic testing device, the reagent cartridge comprising:
   a plurality of reagent containers in which a reagent is filled; and
   a holder formed with a plurality of opening parts in which the reagent containers are loaded and configured to hold the reagent containers loaded in the plurality of opening parts, wherein
   the holder holds the reagent containers movably in a vertical direction in a state in which the reagent cartridge is set in the genetic testing device,
   each of the reagent containers includes a cylindrical container main body part and a container side fitting part formed on an outer circumferential surface of the container main body part,
   the container side fitting part includes a lower protruding part and an upper protruding part which protrude from the outer circumferential surface of the container main body part,
   the upper protruding part is formed below an upper end surface of the container main body part,
   a protrusion height of the upper protruding part from the outer circumferential surface of the container main body part is higher than a protrusion height of the lower protruding part from the outer circumferential surface of the container main body part,
   the holder includes a top plate in which the plurality of opening parts are formed, and a holder side fitting part formed in each of the plurality of opening parts,
   an opening part extends in a direction perpendicular to the top plate,
   the holder side fitting part is formed at a position retracted from the top plate, and
   an inner circumferential surface of the holder side fitting part is an inclined surface in which a diameter thereof becomes smaller downward in the vertical direction.

2. The reagent cartridge according to claim 1, wherein the holder detachably holds the reagent containers.

3. The reagent cartridge according to claim 1, wherein the container side fitting part and the holder side fitting part are loosely fitted in the vertical direction.

4. The reagent cartridge according to claim 3, wherein the lower protruding part is positioned below the upper protruding part in the vertical direction,
   the holder side fitting part protrudes from the opening part toward a center of the opening, and
   a distance in the vertical direction between the lower protruding part and the upper protruding part is greater than a thickness in the vertical direction of the holder side fitting part.

5. The reagent cartridge according to claim 4, wherein the holder side fitting part protrudes from the entire circumference of the opening part toward the center of the opening.

6. The reagent cartridge according to claim 4, wherein an outer surface of the lower protruding part is an inclined surface which recedes from the container main body part upward in the vertical direction.

7. The reagent cartridge according to claim 1, wherein the holder includes one or more wells which accommodate tips, and
   a sealing tape which seals the wells is attached to the holder.

8. The reagent cartridge according to claim 7, wherein the holder includes an identification region to which identification information is attached, and
   the sealing tape is also attached to the identification region.

* * * * *